United States Patent [19]

Sayyadi

[11] Patent Number: 5,072,632
[45] Date of Patent: Dec. 17, 1991

[54] MULTICONDUCTOR CABLE STRIPPER
[75] Inventor: Babak Sayyadi, Seattle, Wash.
[73] Assignee: The Boeing Company, Seattle, Wash.
[21] Appl. No.: 645,040
[22] Filed: Jan. 23, 1991
[51] Int. Cl.$^5$ ............................................. H02G 1/12
[52] U.S. Cl. ................................................... 81/9.51
[58] Field of Search ................... 81/9.51, 9.4; 83/924; 29/564.4

[56] References Cited

U.S. PATENT DOCUMENTS

| | | | |
|---|---|---|---|
| 2,929,285 | 3/1960 | Gulemi | 81/9.51 |
| 2,988,940 | 6/1961 | Folkenroth et al. | 81/9.51 |
| 3,139,778 | 7/1964 | Bielinski et al. | 81/9.51 |
| 3,153,358 | 10/1964 | Havens | 81/9.51 |
| 3,239,918 | 3/1966 | Cobaugh | 29/155.55 |
| 4,019,409 | 4/1977 | McKeever | 81/9.51 |
| 4,543,717 | 10/1985 | Luka | 30/90.6 |
| 4,719,697 | 1/1988 | Schwartzman et al. | 29/867 |
| 4,745,828 | 5/1988 | Stepan | 81/9.51 |
| 4,763,410 | 8/1988 | Schwartzman | 29/828 |

FOREIGN PATENT DOCUMENTS 1349520  4/1964  France .

*Primary Examiner*—Roscoe V. Parker
*Attorney, Agent, or Firm*—Bruce A. Kaser

[57] ABSTRACT

An automated cable stripper that is particularly well-suited for stripping multiconductor cables whose outer surfaces have an irregular contour. The stripper has a clamp assembly for holding the end of the cable during the stripping operation; a cutting and bending assembly for severing the end of the cable's jacket and thereby exposing the underlying shielding material and conductors; and a slug puller assembly for pulling the cut part off the cable's end. Cutting and bending is accomplished by a rotatable barrel or drum that carries a plurality of cutting blades and bending arms. The blades score the jacket around its circumference, and the arms thereafter bend the cable'3 s end back and forth to break the jacket away along the score line. The slug puller assembly has a pair of gripping arms that extend and grip the cut part, and pull it off the cable upon retraction of at least a portion of the puller assembly. The stripper is also adapted to shear off any shielding material that is positioned between the jacket and the cable's conductors.

15 Claims, 12 Drawing Sheets

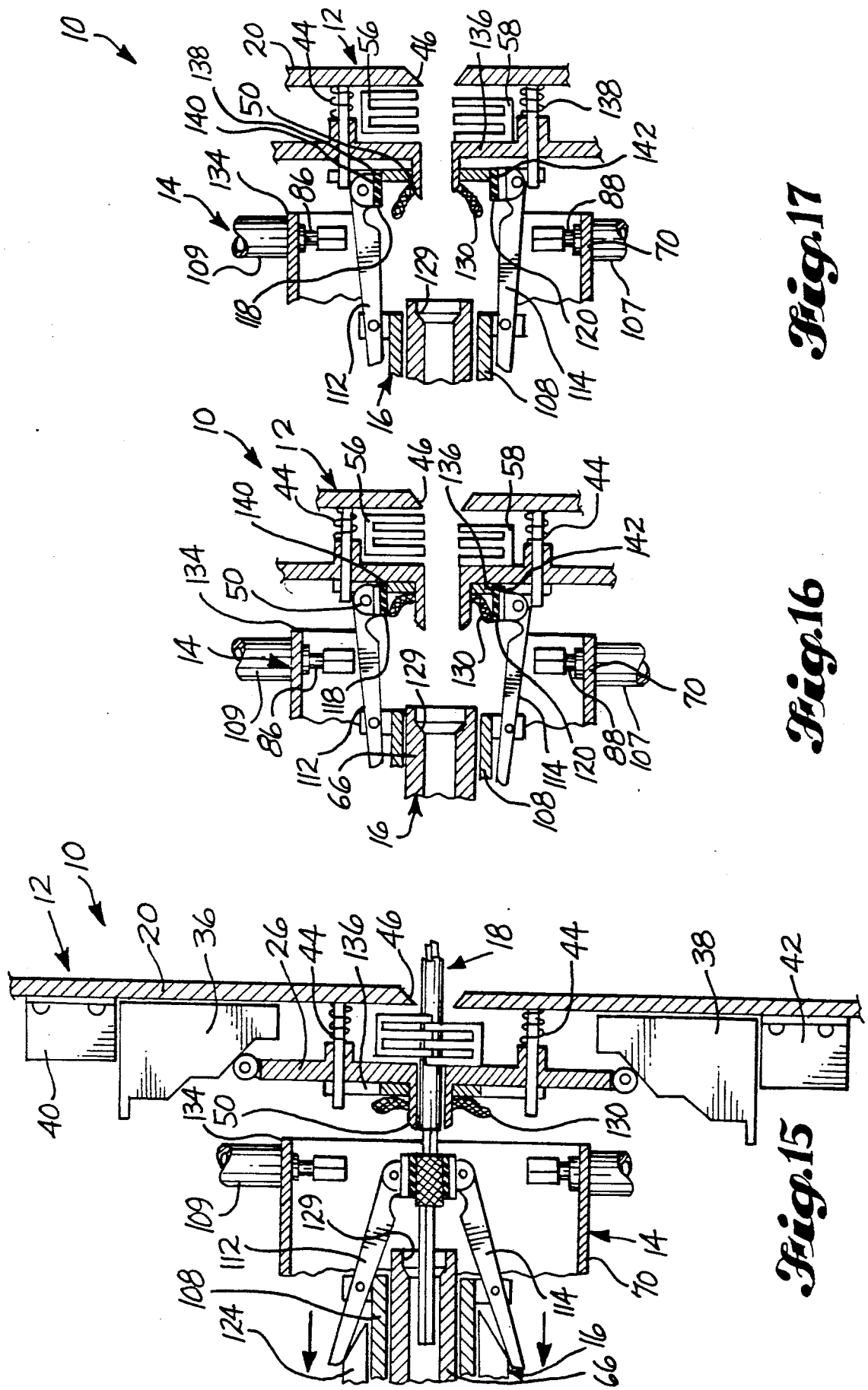

MULTICONDUCTOR CABLE STRIPPER

TECHNICAL FIELD

This invention relates to cable stripping machines, and more particularly, to machines that strip the ends of multiconductor shielded and jacketed cables.

BACKGROUND INFORMATION

A multiconductor, shielded cable typically has two or more individually insulated conductor wires that are twisted around each other. The conductors are surrounded by a braided metal shield that is further covered by an outer jacket. The twisted shape of the conductors defines the shape of the shield and jacket, which gives the cable's outer surface a twisted, irregular shape.

As the skilled person would know, a certain length of both the cable's jacket and the underlying shield must first be stripped off the end of the cable in order to access the conductors for making electrical connections with their ends. When stripping the cable, it is important that the shield not be nicked during cutting and removing the jacket, because it is often a requirement that a certain length of undamaged shield protrude beyond the cut line on the jacket. During shield removal, it is also important that the insulation on the underlying conductors not be nicked.

Because the cable's outer surface is irregular, it is not amenable to stripping via known automated wire strippers. Therefore, each cable has required hand stripping, which involves a laborer first using a blade to cut around the end of the cable's jacket, thus defining the length of the portion to be removed (this is commonly called a "slug"), followed by hand-bending and twisting the cable's end to remove the slug and expose the shield. The shield is thereafter removed by bunching it up near the cut line on the jacket, and snipping it off with shears, or otherwise removing it by a similar procedure.

Hand stripping multiconductor cables is slow, and therefore represents significant labor costs in manufacturing environments where hundreds or thousands of multiconductor cables are used. For this reason, there has been a long-felt need to develop automated machinery that can quickly strip the jacket and shield from these kinds of cables without damaging either the shield or the underlying conductors. As will become apparent, the present invention provides such a machine.

SUMMARY OF THE INVENTION

The invention is a cable stripper that is particularly well-suited for stripping the end of a twisted wire multiconductor cable. The stripper removes both a length or slug portion from the end of the cable's outer jacket, and a 15 certain length of the braided shield which underlies the jacket, thus exposing the ends of the underlying conductors.

A cable stripper in accordance with the invention has a clamp assembly, a cutting and bending assembly, and a slug puller assembly. The clamp assembly is operable to fixedly hold the cable as its end is being stripped. The cutting and bending assembly is operable to cut and break away the slug from the jacket. The puller assembly is operable to pull the slug from the cable, and thereafter remove a portion of the underlying shield.

The clamp assembly has a cable guide member that is shaped to hold the end of the cable in a position so that it projects outwardly from the cable guide member. The cutting and bending assembly has a hollow, cylindrically-shaped barrel portion, or barrel, that is rotationally driven about its centerline axis by an electric motor. The motor rotates the barrel in both clockwise and counterclockwise directions. The barrel is positioned immediately adjacent the clamp assembly, in a manner so that the cable's end is received within the barrel or, in other words, the cable's end projects through an end opening of the barrel and into the hollow space defined by the barrel's cylindrical wall.

Mounted within the barrel are a plurality of cutting blades. These blades are movable radially inwardly through the hollow space defined by the barrel by air cylinders that bring the blades into contact with the cable's jacket. The blades surround the jacket and also center it for cutting. The air cylinders are mounted to the barrel on the outside, but are drivingly connected to the blades through the barrel's wall.

The blades move circularly about the cable's end correspondingly with controlled rotation of the barrel. As the blades circle while in contact with the jacket, they score the jacket around its circumference, and define the length of the jacket slug that is to be removed from the cable's end.

Also mounted to the barrel are a pair of bending members that each are extendible radially inwardly from inside the barrel'cylindrical wall. Like the cutting blades, these members are movable circularly about the cable's end to a plurality of circumferential locations corresponding to controlled barrel rotation. In preferred form, one bending member is positioned diametrically opposite the other, so that the bending members are positioned on opposite transverse sides of the cable. The bending members are reciprocally movable back and forth by air cylinders and push against the cable's jacket. Such action bends the cable's end back and forth, and severs or breaks the jacket slug away from the remainder of the cable's jacket, at the place where it was scored by the blades.

The slug puller assembly, or slug puller, is operable to remove the slug from the cable after cutting and bending, and to thereafter cut and remove the underlying shield material that is exposed after slug removal. It has a puller tube, a tubular shear, and a cam member, all of which are movable in an axial direction relative to each other. The slug puller assembly is reciprocally movable back and forth inside the barrel through an end opening, on the barrel's other side, facing away from the clamp assembly. The slug puller assembly moves between various positions that are adjacent the cable's end, for performing different operations that are described below.

The slug puller assembly has a pair of lever arms pivotably mounted to its puller tube, each with a gripping surface. The gripping surface of one arm directly opposes that of the other. The arms cooperatively grip the outer surface of the slug after it has been broken away, and pull it off the end of the cable as the slug puller assembly retracts through the barrel. Both the cutting blades and bending members are retracted during this operation, in order to permit the slug puller assembly to pass through the barrel.

The pulling operation exposes the cable's braided shield. Afterwards, the slug puller assembly extends first partway, and its lever arms then grip the exposed shield. Preferably, the gripping surfaces of the lever arms are shaped so that they will self-center the free end of the cable as they close upon it. This is followed by the puller assembly further extending toward the cable while the shield is gripped. Such action bunches up a portion of the shield near the place where the cable's jacket was cut.

The cable guide member briefly described above, which is part of the clamp assembly and holds the end of the cable, includes a hollow, cylindrically-shaped guide tube through which the cable's end extends. This tube has an outer end that faces the slug puller assembly and defines a circular die that completely surrounds the cable. The die is positionable next to the jacket cut line.

In the above-described operation, the slug puller assembly grips the shield axially outwardly of the die (the guide tube's end), and pushes at least a portion of it, or bunches it up, next to the die as the puller assembly extends. The tubular shear portion of the puller assembly is a hollow, cylindrical tube that slides over the cable's end until its end mates with the die, and shears off the bunched up portion of the shield. This severs that portion of the shield which was left exposed after the slug was pulled from the end of the cable.

The tubular shear is received within and axially reciprocates through the puller tube portion of the slug puller assembly. As mentioned above, the puller assembly's lever arms are pivotably mounted to the latter tube. Each lever arm has opposite outer ends. One of the previously-mentioned gripping surfaces is pivotably mounted to one end, while the other end has a cam follower surface.

The cam member portion of the puller assembly surrounds the outer puller tube and slidably reciprocates back and forth independently of puller tube movement. It has a sloped or conically-shaped camming surface that thrusts against the cam follower surfaces of the lever arms, for pivoting them and causing their gripping surfaces to grip either the cable's jacket or the shield, as the case may be, depending on which one of the two is being removed. Retraction of the cam member enables the gripping surfaces to spread apart.

After the shield is sheared off, the cable is removed from the cable stripper, and both the cable guide and the tubular shear are axially moved away from the barrel of the cutting and bending assembly, until the sheared off material is positioned outside the barrel's end. The clamp assembly has a vertically upstanding mounting plate, and a plurality of guide rods that project forwardly of such plate toward the barrel. The cable guide tube, which defines the cable guide member and circular die as described above, is connected to and carried by a cam plate that is substantially parallel to the mounting plate. The cam plate is slidably mounted on the guide rods for movement both toward and away from the mounting plate, and corresponding movement toward and away from the barrel.

The cable guide tube defines a cylindrical guideway or passageway through the cam plate that is in axial alignment with an opening in the mounting plate. Prior to stripping, the cable is first extended through the mounting plate opening, and then through the cylindrical tube, and projects outwardly into the barrel beyond the circular die making up the tube's end. A clamp device is positioned between the mounting plate and the cam plate. This device has opposing clamping members that engage the cable from opposite sides and fixedly hold the cable in place during stripping.

Also slidably mounted to the mounting plate guide rods is a sweep plate that is connected to the cam plate by a plurality of springs. After the die has been retracted, after a shearing operation, so that it is no longer inside the barrel, the tubular shear retracts away from the die, and the lever arms of the slug puller assembly extend and grip the sweep plate. The lever arms then pull the sweep plate toward the barrel, thus sweeping off any remaining sheared off material that surrounds the guide tube.

The position of the cam plate and sweep plate is adjusted in unison, relative to the mounting plate, by a pair of step-cam members that are symmetrically reciprocable toward and away from each other, from opposite directions, at least partway in between the cam plate and the mounting plate. Each one of these members has a ramped surface that drivingly contacts an outer edge of the cam plate, such edge having a roller for facilitating such contact. Each ramped surface has a plurality of separate sloped surfaces. As the step-cam members move one way or the other, they adjust the distance between the cam plate and mounting plate as the cam plate rollers roll along these sloped surfaces. A spring interconnects the cam plate and the mounting plate, and is normally biased to pull the cam plate toward the mounting plate. The step-cam members oppose the bias of this spring.

Having thus summarized the invention, the various particulars and details of the same will become better understood upon consideration of the following description, which is to be taken in conjunction with the appended drawings.

BRIEF DESCRIPTION OF THE DRAWINGS

In the drawings, like reference numerals and numbers refer to like parts throughout the various views, and wherein:

FIG. 15 is a fragmentary cross-sectional view of the stripper's clamp assembly;

FIG. 16 is a fragmentary cross-sectional view like FIG. 15;

FIG. 17 is a fragmentary cross-sectional view like FIGS. 15 and 16;

FIG. 18 is a pictorial view of a cable stripper blade in accordance with the invention;

FIG. 19 is an enlarged fragmentary view of the stripper's blades in contact with the jacket of a twisted wire multiconductor cable;

BEST MODE FOR CARRYING OUT THE INVENTION

Figure 1:
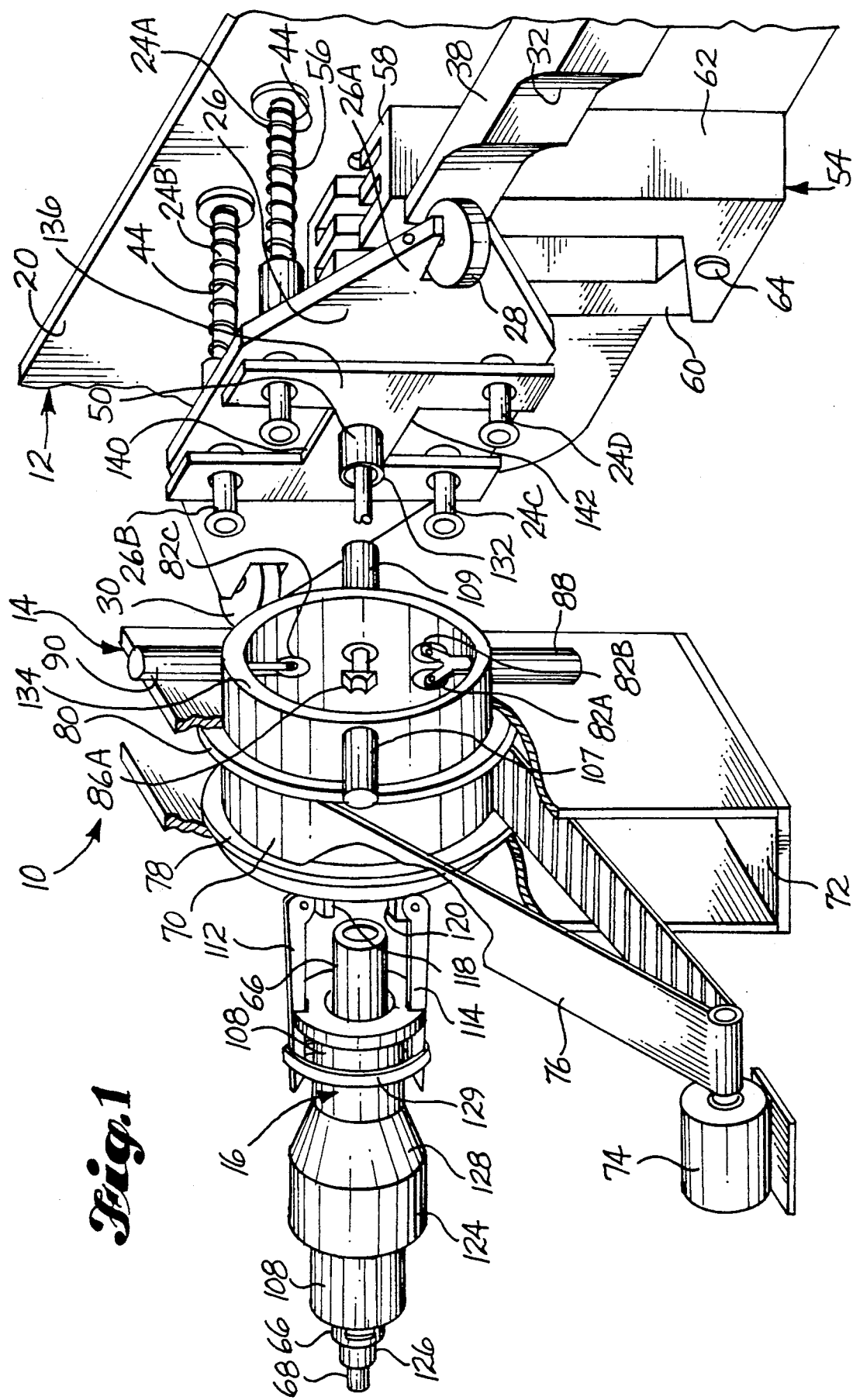
FIG. 1 is a modified bent-axis pictorial view of a cable stripper in accordance with the invention.

Referring now to the drawings, and first to FIG. 1, shown at 10 is a cable stripper machine in accordance with a preferred embodiment of the invention. The stripper 10 has three primary portions or subassemblies: a clamp assembly, indicated generally at 12; a cutting and bending assembly, indicated generally at 14; and a slug puller assembly, indicated generally at 16.

Figure 2:
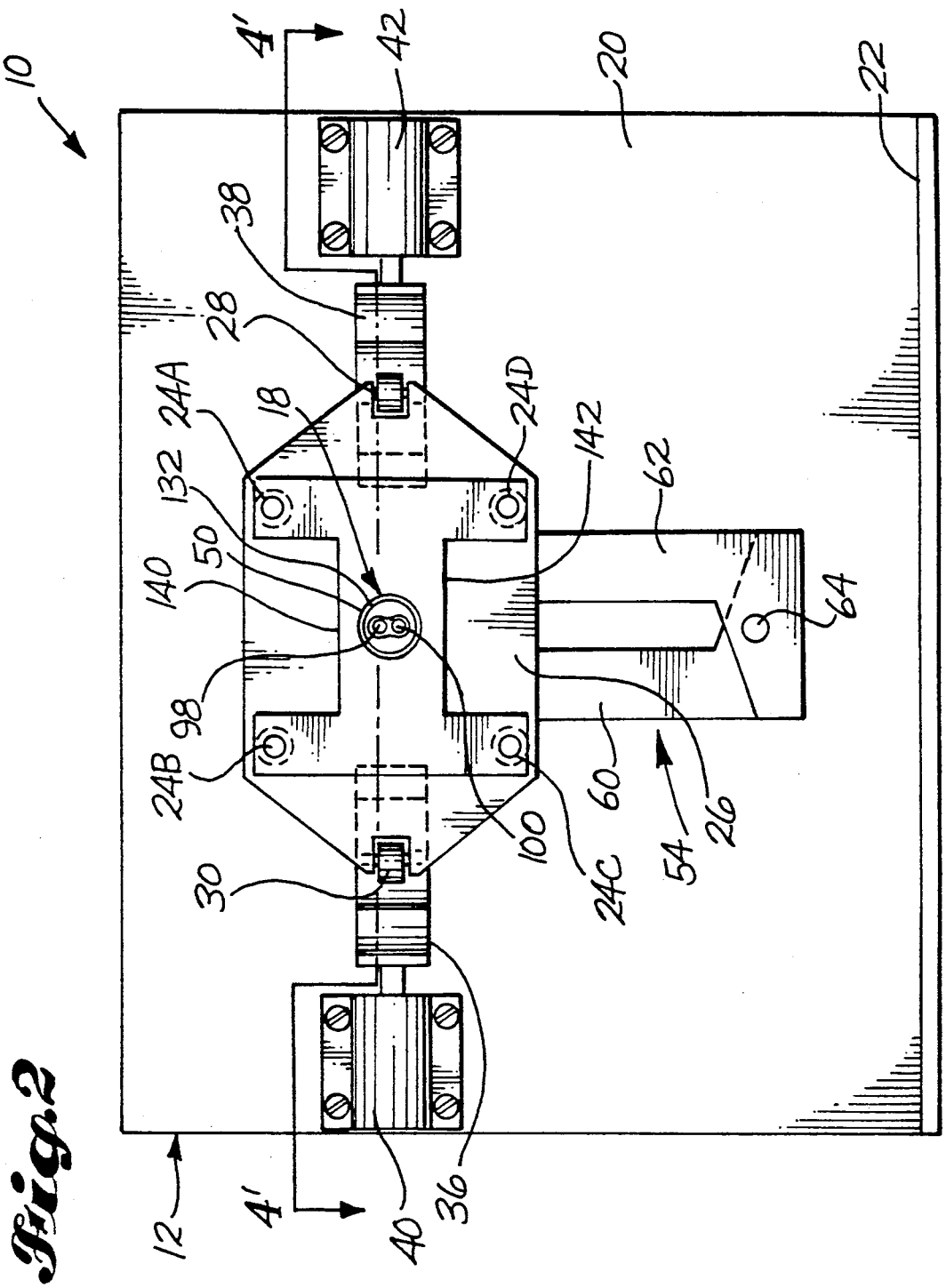
FIG. 2 is a frontal view of the cable stripper's clamping assembly, and is taken along line 2—2 of FIG. 5.

A cable 18 that is to be stripped by the machine 10 is held in fixed position by the clamp assembly 12. The clamp assembly 12 has a vertically-upstanding mounting plate 20 which is mounted to a base 22 (see FIG. 2). Projecting outwardly from mounting plate 20 are a set of four guide rods 24a, 24b, 24c, 24d. Slidably mounted to these guide rods 24a-24d is a cam plate 26. Such plate 26 has opposite lateral edge portions rollers ride along on the ramped surfaces 32, 34 of a pair of step-cam members 36, 38.

Referring now to FIG. 2 and FIGS. 15-17, the step-cam members 36, 38 at least partially extend between cam plate 26 and mounting plate 20, and are symmetrically reciprocable toward and away from each other by actuators 40, 42. Each ramped surface 32, 34 of each step-cam member 36, 38 has a plurality of separately sloped surfaces 32a, 32b, 34a, 34b, which are in rolling contact with cam plate rollers 28, 30. Depending upon the particular extended or inserted position of the step-cam members 36, 38, ramped surfaces 32, 34 operate to adjust the distance between cam and mounting plates 26, 20. Each guide post 24a-24d is surrounded by a spring 44, which normally pulls cam plate 26 toward mounting plate 20. Such motion is opposed by step-cam members 36, 38.

Figure 4:
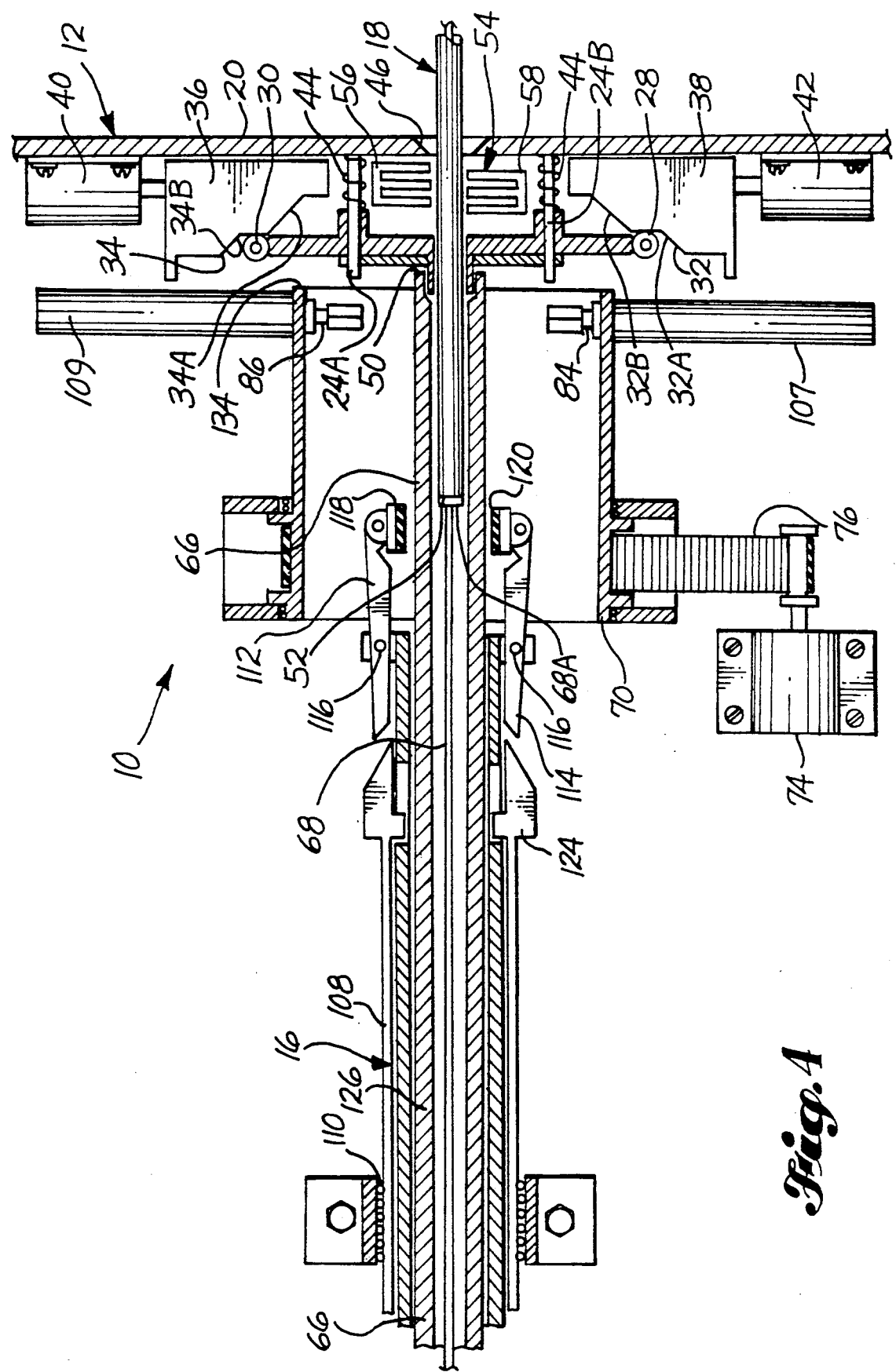
FIG. 4 is a cross-sectional view of the cable stripper, and is taken along lines 4—4 in FIG. 3 and 4'—4' in FIG. 2, and shows the cable stripper receiving the end of a multiconductor cable for stripping the same.

Referring now to FIG. 4, the cable 18 is positioned in the clamp assembly 12 by inserting it through an opening 46 in mounting plate 20 that is in axial alignment with a guide opening 48 in cam plate 26. Projecting outwardly from the cam plate 26 is a guide member or guide tube 50 which provides a passageway that directs the cable's end 52 into the clamping and bending assembly 14.

Positioned between mounting and cam plates 20, 26 is a clamping device, indicated generally at 54. This device 54 has a pair of opposing clamping members 56, 58, which close upon and engage the cable 18 from opposite sides. The clamping device 54 is better seen in FIG. 2. Its opposing clamping members 56, 58 are carried at the ends of arms 60, 62, which are pivoted together as shown at 64. The arms 60, 62 are closed together or spread apart by actuators, similar to the actuators 40, 42 that operate the step-cam members 36, 38. These are not shown in the drawings, however.

At the beginning of a stripping operation, the puller assembly 16, which will be described in greater detail below, is in the position shown in FIG. 4. The cable's end 52 is inserted inside a tubular shear portion 66 of the puller assembly 16, until it contacts a trigger 68. As is apparent from the drawings, the trigger 68 is in the form of a push rod having a head 68a against which the cable's end 52 abuts. When the cable's end 52 pushes the push rod 68 inwardly, from right to left, the stripper 10 is triggered into operation, and begins a series of stripping operations, or events, as follows.

Upon triggering, the puller's assembly 16 retracts, and at least partially withdraws relative to the cable's end 52. It does not retract completely, but only an amount sufficient to expose a portion of the cable's jacket for cutting. This is best shown at 69 in FIG. 21.

Figure 3:
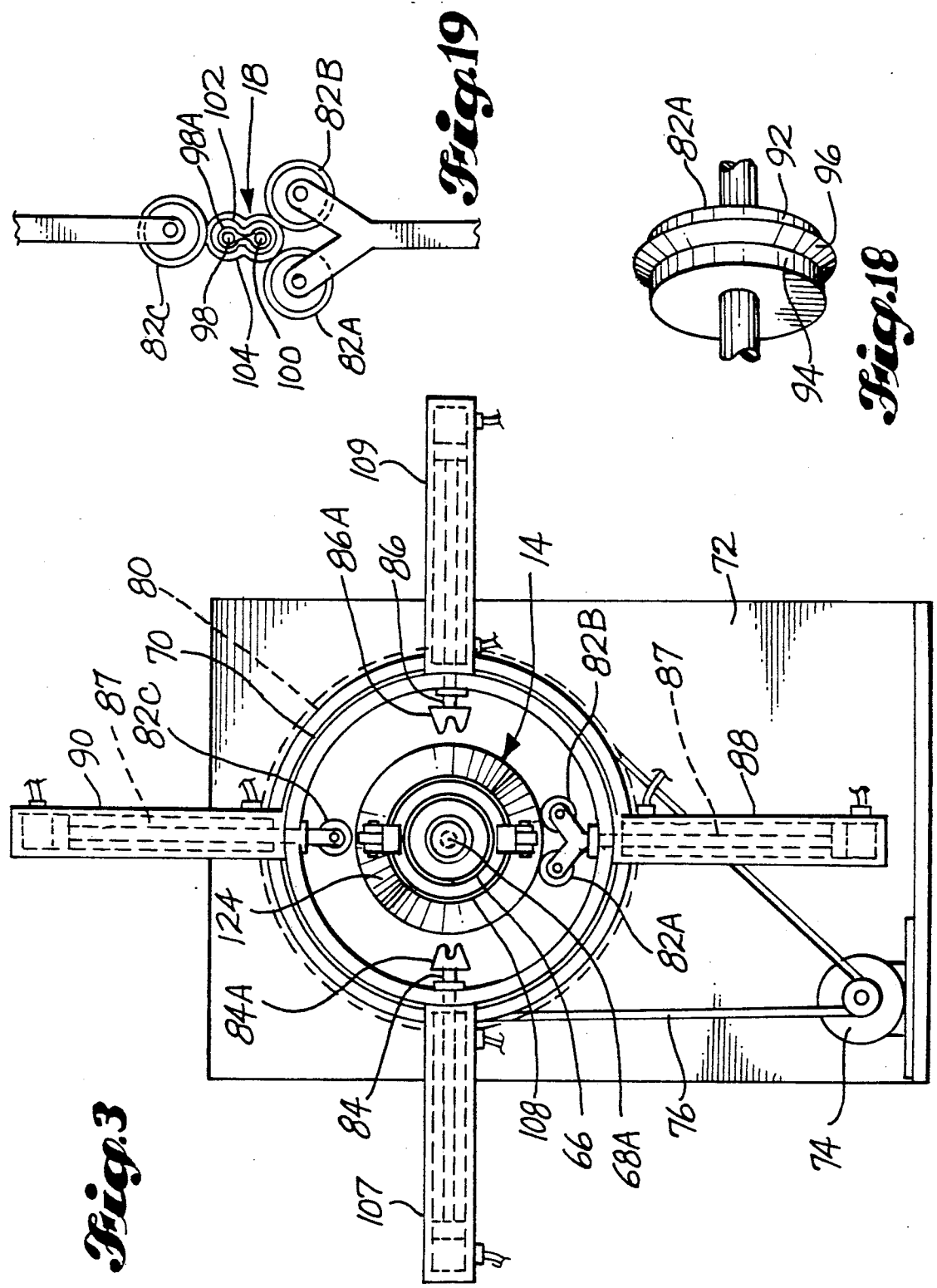
FIG. 3 is a frontal view of the cable stripper's cutting and bending assembly, and is taken along line 3—3 in FIG. 5.

Referring now to FIG. 3, the cutting and bending assembly 10 has a rotatable barrel portion, or barrel 70, that is mounted to a base 72. An electric motor 74 is also mounted to base 72, and drives barrel 70 in controlled rotation, clockwise or counterclockwise, about its centerline axis, by means of a conventional belt 76. FIG. 1 shows belt 76 held in position around barrel 70 by a pair of radial flanges 78, 80.

The barrel 70 carries a set of three cutting blades 82a, 82b, 82c, and a pair of bending arms 84, 86, for respectively cutting and bending the cable 18, to strip the end of its jacket. In preferred form, a pair of blades 82a, 82b, making up part of the set, is mounted to barrel 70 on one transverse side of cable 18, while the third blade 82c, making up the remainder of the set, is mounted on the opposite transverse side.

Figure 21:
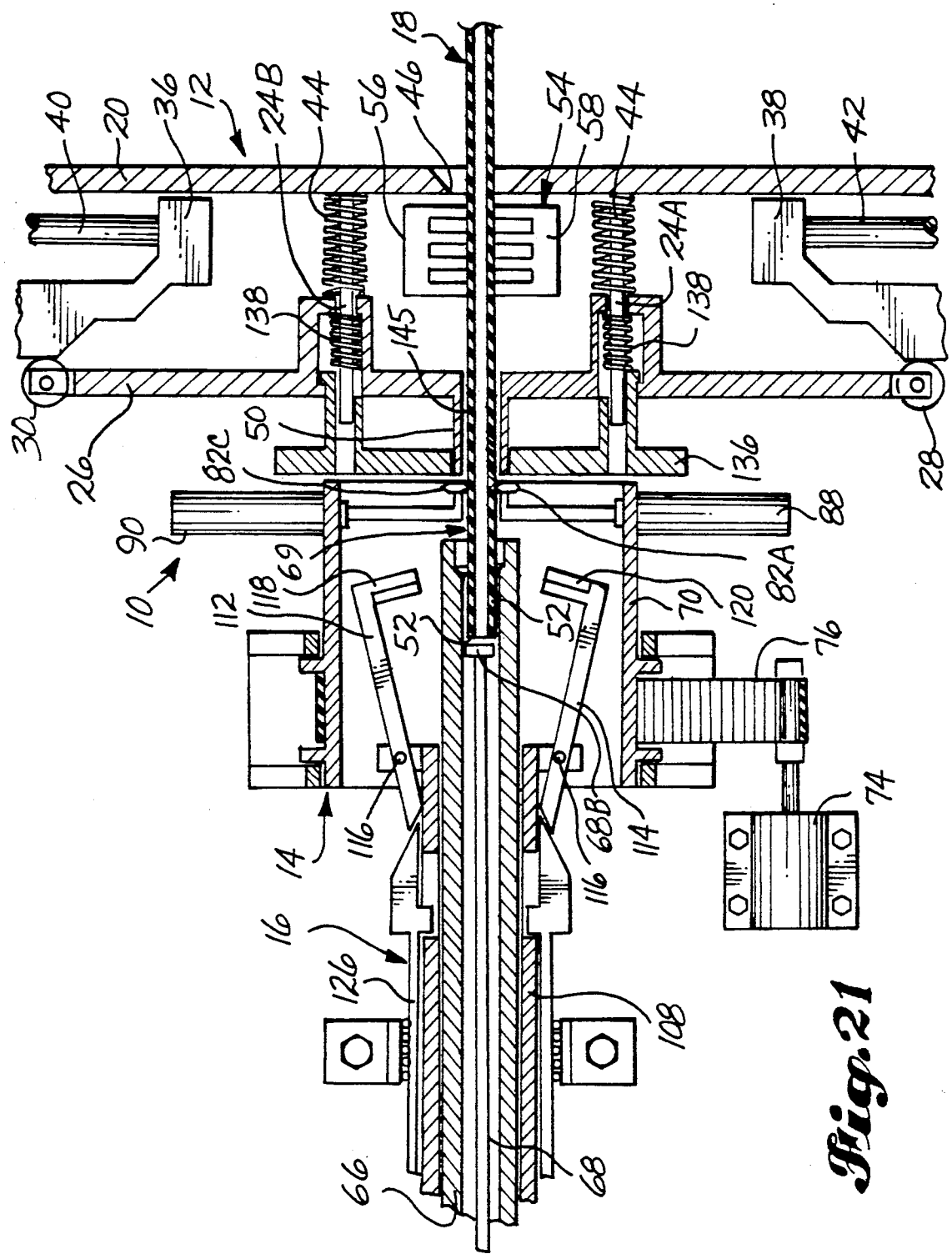
FIG. 21 is a cross-sectional view similar to FIGS. 4 and 5, but shows an alternative embodiment of both the stripper's gripping surfaces and clamp assembly, and shows the stripper's barrel rotated 90° relative to its position as shown in FIGS. 4 and 5.

Blades 82a, 82b are driven radially inwardly by an air cylinder 88 that is mounted to barrel 70, on its outside wall. A cylinder rod 87 extends through the barrel's wall for moving the blades 82a, 82b. Similarly, blade 82c is driven inwardly from the opposite side by another air cylinder 90. When the blades 82a-82c close upon the cable's end 52, they cooperatively center it as shown in FIGS. 19 and 21.

FIG. 18 shows the construction of each blade 82a-82c. Each blade is round, but has stops 92, 94 on each side of its cutting edge 96. The stops 92, 94 define the cut depth of the blades as they circle the cable 18.

Twisted wire multiconductor cables generally have at least two conductors, indicated at 98, 100, respectively, in FIG. 19. Each conductor is surrounded by its own layer of insulation 98a, 100a. Surrounding the wires 98, 100 is a braided metal shield 102. This shield 102 is further surrounded by a protective outer jacket 104, The twisted configuration of the wires 98, 100 imparts an irregular shape to both the shield and jacket 102, 104. Generally, the jacket 104 is made of a harder form of insulating material, such as KAPTON (trademark), for example.

Referring again to FIG. 21, the blades 82a-82c circle and cut or score the cable 18 as barrel 70 is rotated by motor 74. Having a pair of spaced blades 82a, 82b on one side of the cable 18, and a single blade 82c on the other side, enables the blades to follow the irregular contour of the cable's outer surface as they circle. Depending on the type of cable to be stripped, it is possible that more than one blade set may be required. This is not shown in the drawings, however.

It should be appreciated that the barrel 70 is not driven in a continuous 360° rotation when the cable 18 is either cut 15 bent. As mentioned above, the cutting blades 82a-82c are driven radially inwardly by air cylinders 88, 90 mounted to the barrel 70. Although not shown in the drawings, each cylinder 88, 90 is connected to an air feed line. It would be impossible to continuously rotate the barrel 70 without tangling air feed lines. For this reason, a preferred mode of cutting rotation would be a first rotation of 180° in one direction, followed by a counter rotation of 180°. This would create a score line 106 completely around the circumference of the cable's end 52.

Blade stops 92, 94 define the cutting depth of the blades in a way so that the blades will not cut completely through the cable's outer jacket 104, but will instead only score a line 106 partially into the thickness of the jacket. After the blades 82a-82c have scored the jacket 104, they are retracted from the cable's end 52. The score line 106 is placed in the jacket 104 near the end of the clamp assembly guide tube 50 (see FIGS. 7 and 8.)

Figure 6:
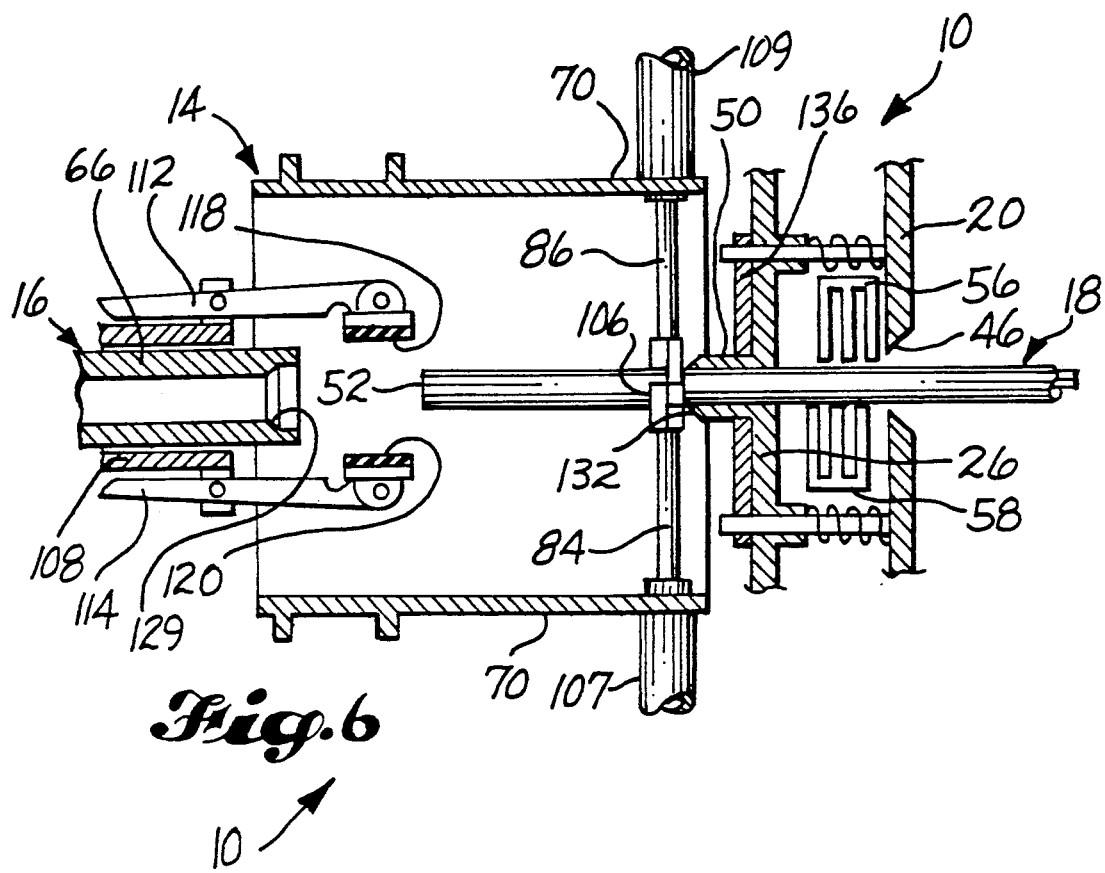
FIG. 6 is a fragmentary cross-sectional view like FIG. 4, but shows the cable stripper's bending members extending into contact with the cable's end.
Figure 20:
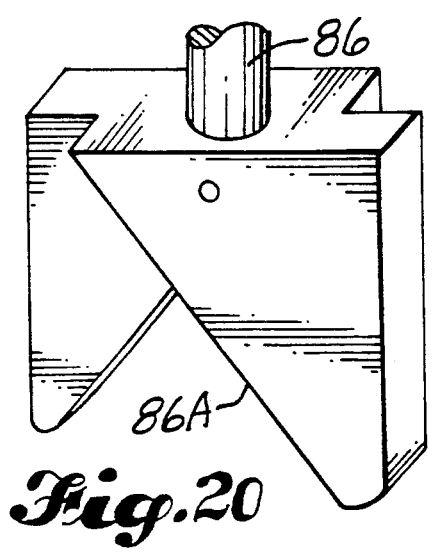
FIG. 20 is an enlarged pictorial view of the end of either a bending member or gripping arm.

Thereafter, the bending arms 84, 86 are extended into contact with the cable's end 52. This is best seen in FIG. 6. Each bending arm 84, 86 has a jacket-pushing surface 84a, 86a. FIG. 20 is an enlarged view of a preferred shape or configuration for such surfaces. It is also preferable that each jacket-pushing surface 84a, 86a be electrically conductive, so that each may be used as a continuity probe to make sure the cable's jacket has been removed prior to a shield stripping operation.

Figure 7:
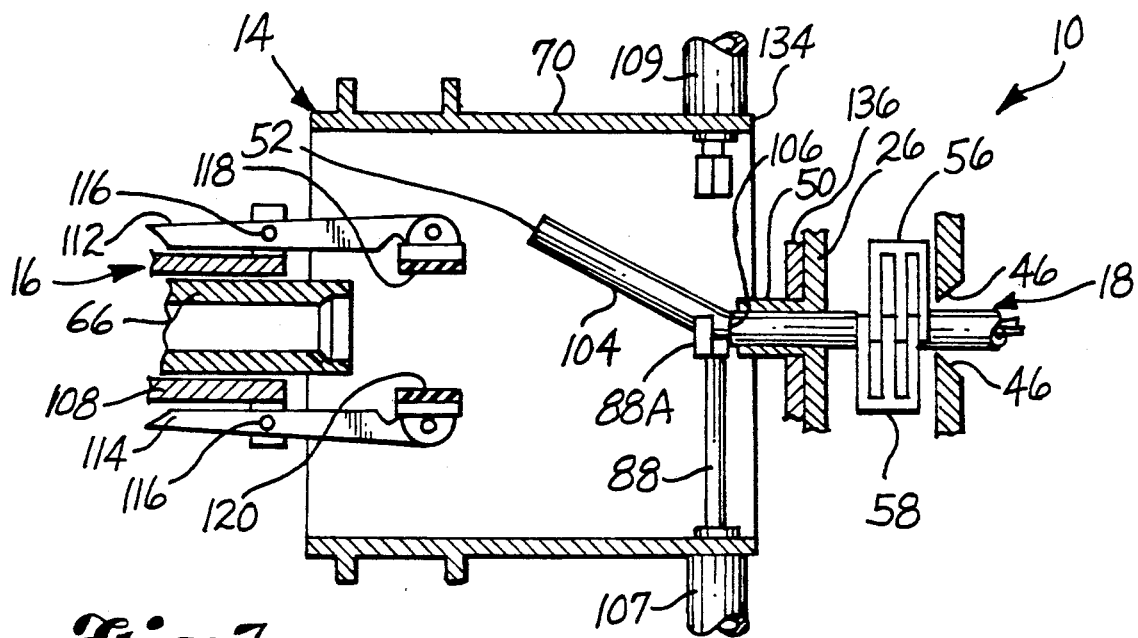
FIG. 7 is a fragmentary cross-sectional view of the cable stripper, but shows one of the cable stripper's bending members retracted, and the other extended, for bending the cable's end back and forth.
Figure 8:
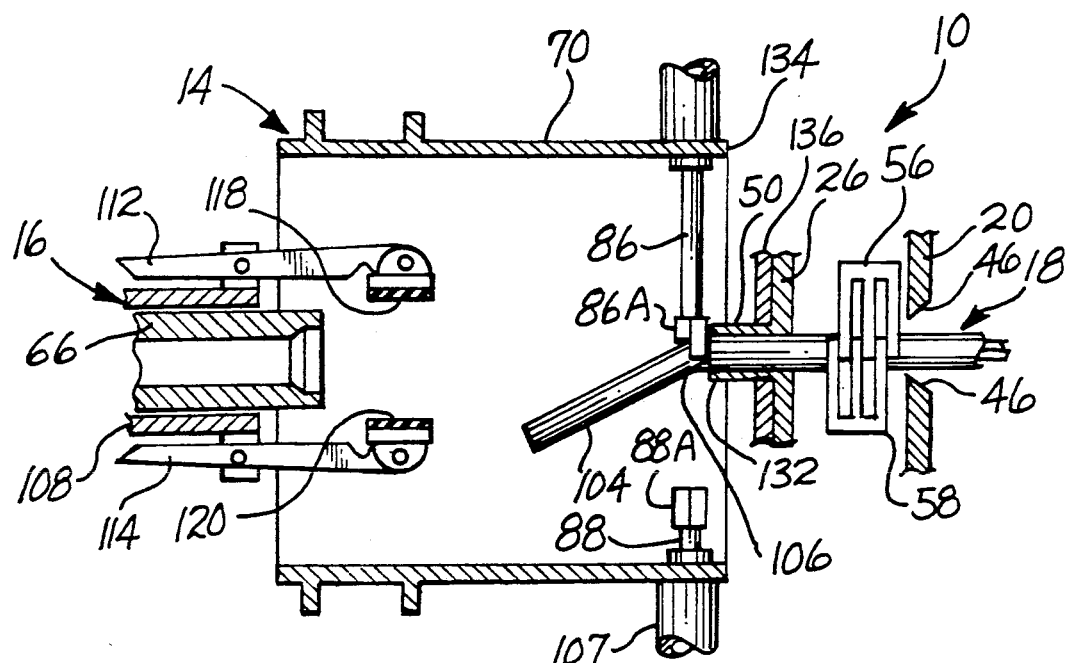
FIG. 8 is a cross-sectional view like FIG. 7, but shows the position of the bending members reversed.

The bending members 84, 86 reciprocate back and forth within barrel 70 in the manner shown in FIGS. 7 and 8. Like the cutting blades 82a-82c, the bending members are driven by air cylinders 108, 109 mounted on the barrel's outside. This reciprocating action breaks away a slug portion 104 of the jacket, along cut-line 106. Like the blades 82a-82c, bending members 84, 86 are positionable at various circumferential locations around the cable's end 52 in correspondence to rotation of barrel 70. However, bending at a first circumferential position, followed by bending after a single 90° rotation, would probably be sufficient to break away slug portion 104.

Figure 5:
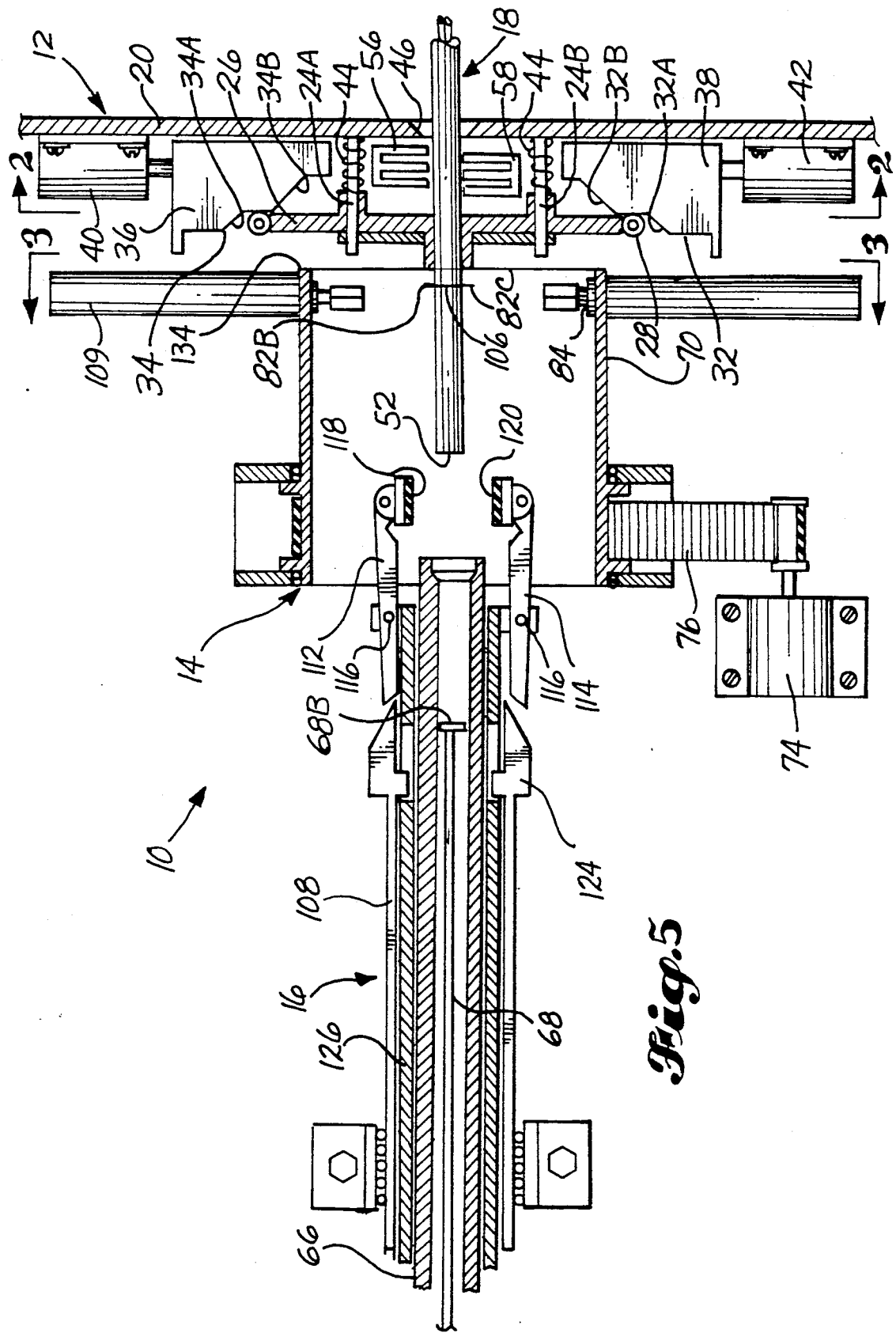
FIG. 5 is a cross-sectional view like FIG. 4, but shows where the cable stripper's blades contact the cable's end.
Figure 9:
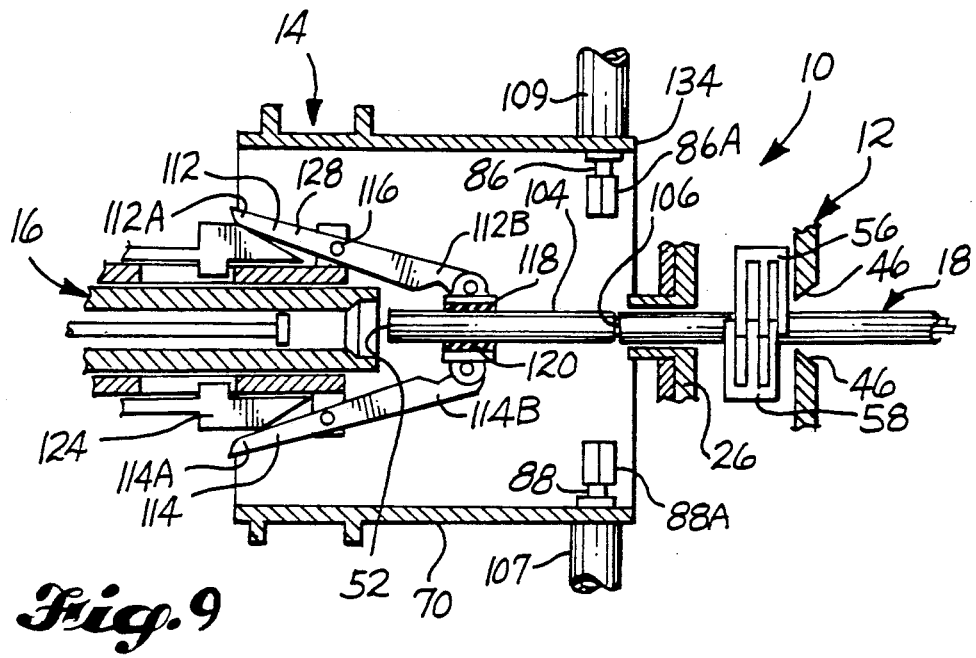
FIG. 9 is a fragmentary cross-sectional view of the cable stripper, but shows its puller assembly in position to pull off a slug portion from the end of the cable's jacket.

After bending, the bending members 84, 86 are retracted, and the slug puller assembly 16 once again extends, but to the position shown in FIG. 9. The slug puller 16 has a plurality of tubes which are concentrically arranged. An outer tube 126 reciprocates through a bearing 110, and supports the other tubes (see FIGS. 4 and 5). Positioned immediately inside tube 126 is a slug puller tube 108, which carries a pair of lever arms 112, 114. Each lever arm is pivotably mounted to puller tube 108 as shown at 116. The point of connection 116 is roughly intermediate of each arm's inner and outer ends 112a, 112b, 114a, 114b.

Pivotably connected to each lever arm outer end 112b, 114b is a gripping surface 118, 120. These surfaces 118, 120 close upon the slug portion 104 of the cable, once the slug portion has been broken away from the cable's jacket. It is preferable that gripping surfaces 118, 120 be shaped so that they are self-centering, i.e. they will center the cable's end 52 as they close upon it To best accomplish this, each surface may be shaped similarly to the jacket-pushing surfaces 84a, 86a of the bending arms 84, 86, as illustrated in FIG. 20.

The lever arm gripping surfaces 118, 120 are closed and opened by operation of a cam member 124 that is axially driven back and forth, in reciprocating motion, by outer tube 126. Cam member 124 has a conically-shaped camming surface 128 that rides against the inner ends 112a, 114a of the lever arms 112, 114. These ends 112a, 114a are likewise shaped to follow the slope of conically-shaped surface 128.

Figure 10:
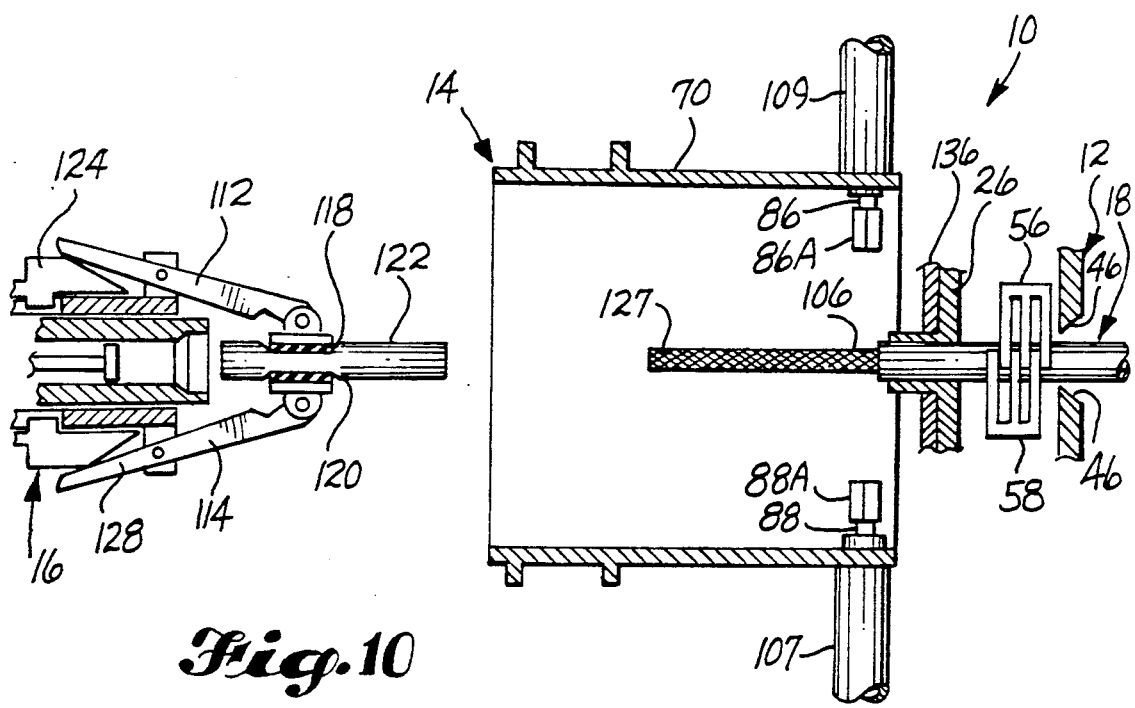
FIG. 10 is a fragmentary cross-sectional view like FIG. 9, but shows the stripper's puller assembly in a retracted position after pulling the slug portion off the cable's end.

Moving cam member 124 from left to right spreads apart lever arm ends 112a, 114a, and closes gripping surfaces 118, 120 onto the cable. Thereafter, the puller assembly 16 is retracted through bearing 110 in the manner shown in FIG. 10. This pulls slug 104 off the cable 18, and exposes the cable's underlying shield. It is preferred that the puller tube 108 be free to rotate inside outer tube 126 during such operation, so that the slug portion 104 can rotate and follow the cable's contour during pulling, thus making it easier to remove.

Afterward, cam member 124 retracts relative to puller tube 108 (outer tube 126 retracts through bearing 110), which permits the outer ends of lever arms 112, 114 to spread apart so that slug 104 drops free of puller assembly 16. An elastic band 129 (shown in FIG. 1) surrounds the arms' inner ends 112a, 114a, and pulls them laterally inwardly upon retraction of the cam member 124, for opening the arms. A conventional spring arrangement (not shown) could accomplish the same function.

Figure 11:
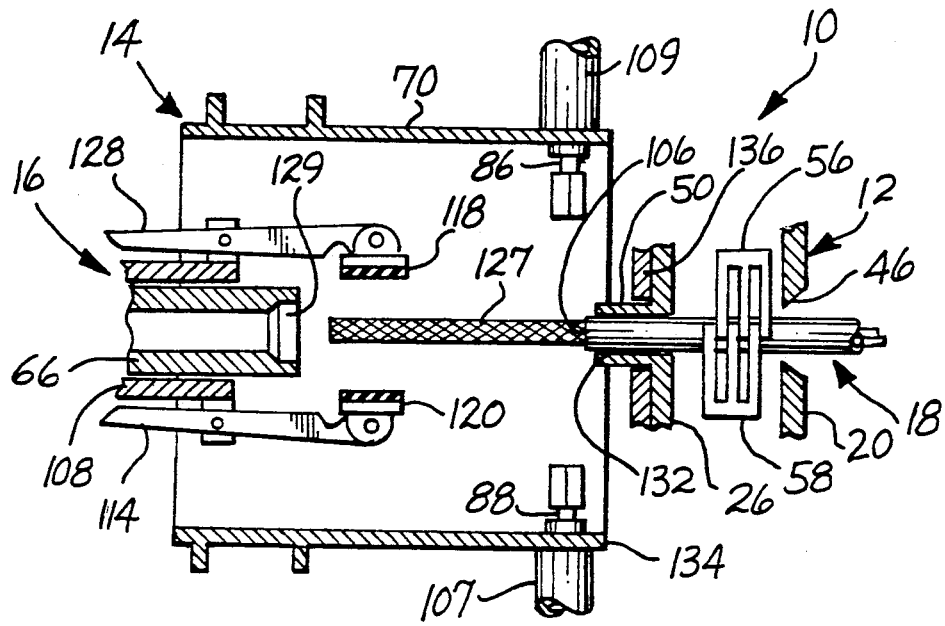
FIG. 11 is a fragmentary cross-sectional view like FIG. 10, but shows the puller assembly positioned for bunching up the cable's shield.
Figure 12:
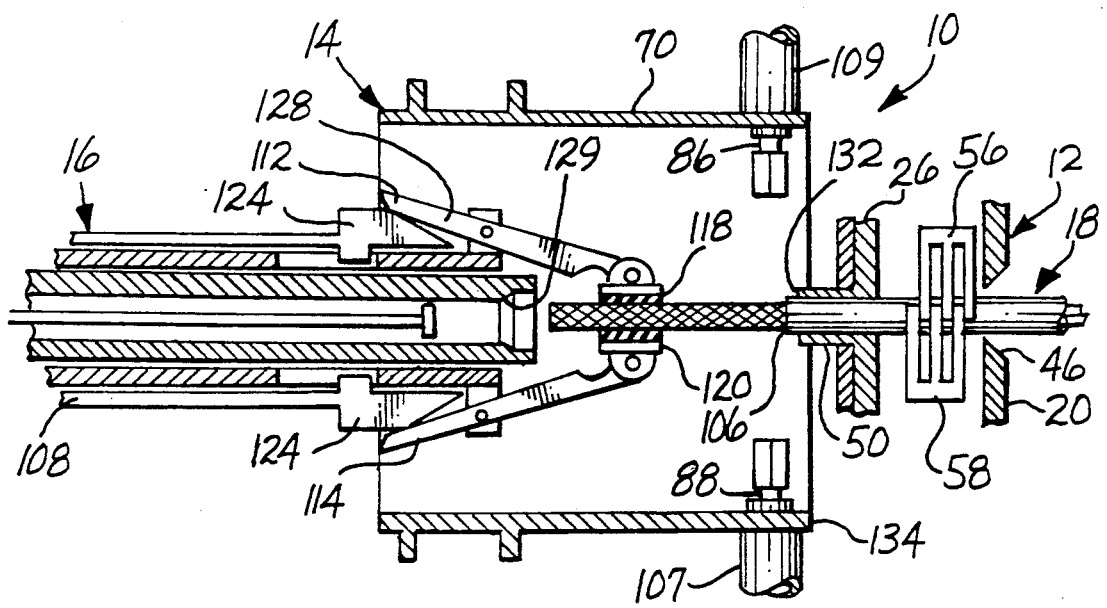
FIG. 12 is a fragmentary cross-sectional view like FIG. 11, but shows the puller assembly gripping the cable's shield for bunching it up.
Figure 13:
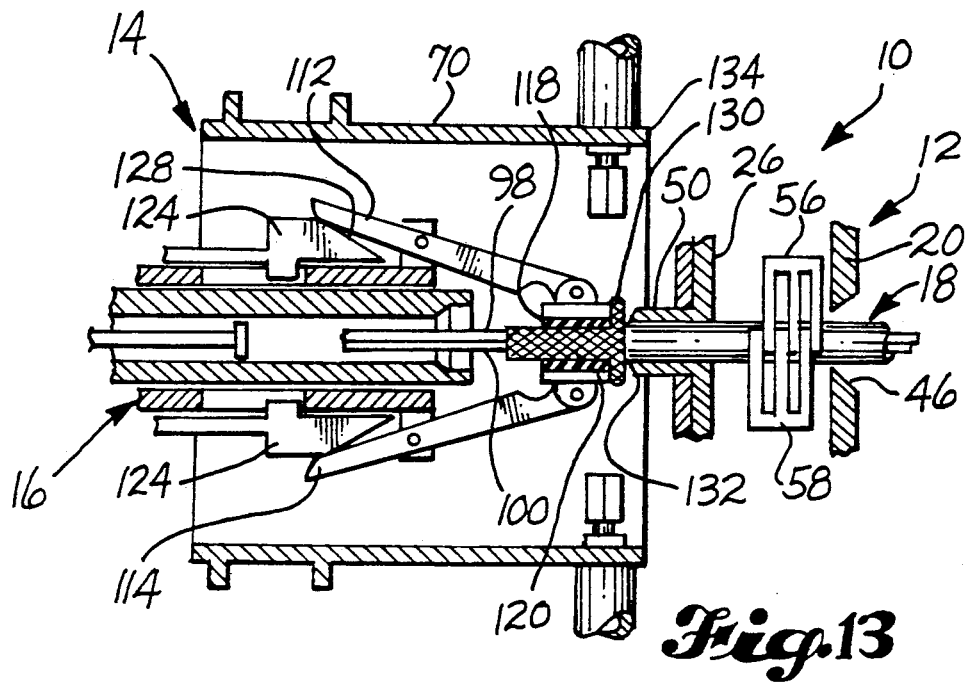
FIG. 13 is a fragmentary cross-sectional view like FIGS. 11 and 12, but shows the puller assembly axially moving toward the cable's end for bunching up a portion of the cable's shield.

With the lever arm gripping surfaces 118, 120 remaining in the spread-apart condition, puller assembly 16 extends to the position shown in FIG. 11. Thereafter, the gripping surfaces 118, 120 are closed upon the cable's shield 127 (see FIG. 12), and the puller assembly pushes surfaces 118, 120 toward guide tube 50. This bunches up the shield adjacent the end of the guide tube, as shown at 130 in FIG. 13.

Figure 14:
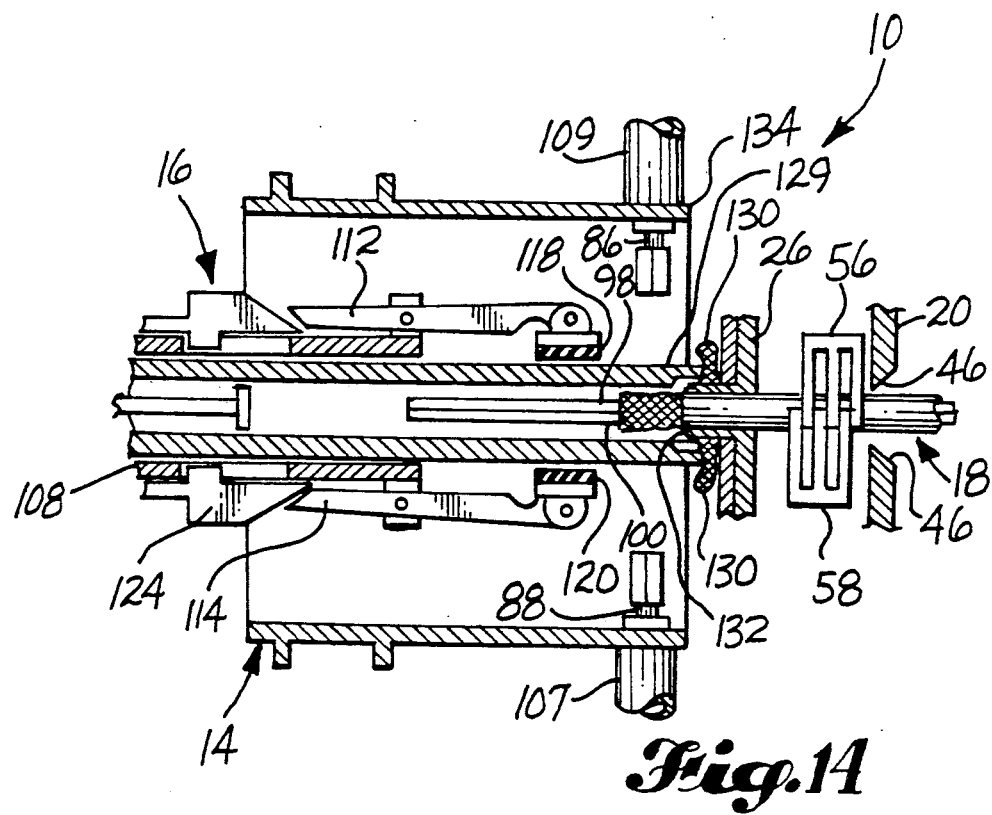
FIG. 14 is a fragmentary cross-sectional view like FIGS. 11-13, but shows a tubular shear portion of the puller assembly cutting off the cable's shield after it has been bunched up.

Referring again to FIG. 2, the end of guide tube 50 defines a circular die 132. The previously-mentioned shear tube 66, of puller assembly 16, reciprocates back and forth inside tube 108, along an axis that generally coincides with the center point of circular die 132. After the shield is bunched up, lever arms 112, 114 once again spread apart, and shear tube 66 extends forwardly until its inner end surface 129 mates with die 132, thus shearing off the bunched-up portion 130 of the shield 127. This is best seen in FIG. 14.

After the shear tube 66 shears off portion 130, which is left hanging around guide tube 50. Both the shear tube 66 and guide tube/cam plate 50, 26 are moved axially from left to right until the sheared-off material is beyond the open end 134 of barrel 70.

All of the tubes 108, 66, 126 making up puller assembly 16, are axially moved independently of the others by air drive cylinders, or equivalent actuators. As should be apparent, at certain times one tube is moved while others remain stationary. At other times, all three tubes 108, 66, 126 are moved simultaneously. As described above, the cam plate 26 moves by simultaneously retracting step-cam members 36, 38 so that springs 44 pull the cam plate 26 toward the mounting plate 20. This is best shown in FIG. 15.

Referring again to FIG. 2, an "H"-shaped sweep plate 136 is mounted to guide rods 24a-24d, forwardly of cam plate 26. The sweep plate 136 is connected to the cam plate 26 by four small springs 138 (see FIG. 17), which surround the guideposts 24a-24d, and are positioned in between the sweep and cam plates 36, 26.

After the shield is sheared, and prior to removal of cable 18 from the stripper 10, shear tube 66 is retracted, and lever arms 112, 114 are operated to pull off any remaining shield material that still surrounds the cable's conductors 98, 100. This is done in the same way the jacket slug 122 was removed (see FIG. 15). Afterwards, the lever arms 112, 114 are extended to the position shown in FIG. 16. There, their gripping surfaces 118, 120 grasp upper and lower edges 140, 142 (see FIG. 2) of the sweep plate 136. Puller tube 108 is thereafter retracted, which pulls the sweep plate 136 forwardly relative to the cam plate 26, as shown in FIG. 17. This sweeps the shield material off cable guide 50, and permits it to drop free of the stripper 10. Thereafter, the step-cam members 36, 38 once again move inwardly to return the cam plate 26 and guide tube 50 to the position shown in FIG. 1. The lever arms 112, 114 then retract while the shear tube 66 extends to cover the end of guide tube 50, to serve as a guide for the end of the next cable to be stripped.

FIG. 21 shows an alternative embodiment of the clamp assembly 12, and the gripping surfaces 118, 120 of lever arms 112, 114. There, barrel 70 of the cut and bend assembly 14 is shown rotated 90° from its position as shown in the other FIGS., so that cutter blades 82a, 82c can be seen in cutting contact with the outer surface 145 of a cable's jacket.

In the FIG. 21 embodiment, the sweep plate 136 is forwardly biased by springs 138. That is to say, when shear tube 66 moves axially forwardly in the above-described manner, to mate with die 132 of cable guide 50 in a shearing action, the end 147 of the shear tube 66 pushes sweep plate 136 aft of the die 132, opposing the bias of springs 138. The sweep plate 136 then automatically returns to its original position, and sweeps the cable guide 50 when the shear tube 66 retracts, thus eliminating the need for lever arms 112, 114 to pull it forward in the manner shown in FIGS. 16 and 17.

Having described the presently-known best mode for carrying out the invention, it is to be understood that the cable stripper 10 described above, and shown in the drawings, could be altered in many ways without departing from what is considered to be the spirit and scope of the invention. For example, it is conceivable, and indeed, it may be likely, that the cable stripper 10 disclosed here will be improved upon. For this reason, any of the foregoing description should not be taken or interpreted in a limiting way, but instead should be used to give life and meaning to the subjoined patent claims which follow. It is the claims which define the metes and bounds of what is considered to be patented, the interpretation of which is to be made in accordance with the established doctrines of patent claim interpretation.

What is claimed is:

1. A cable stripper for removing a slug portion from the end of a jacket that makes up the outer covering of a multiconductor cable, for exposing the ends of said cable's conductors to make them accessible for subsequent electrical connections, said stripper comprising:
   a clamp assembly for fixedly holding said cable during a cable stripping operation, said clamp assembly having a cable guide member that is shaped to hold one end of said cable in a position so that said end projects outwardly from said guide member; and
   a cutting and bending assembly positioned adjacent said clamp assembly, and adapted to receive said cable's end, said cutting and bending assembly including:
      a plurality of cutting blades that are movable radially inwardly into centering contact around said jacket, said blades being circularly movable about said cable's end when in such contact, for scoring said jacket around its circumference and defining the length of said slug portion; and
      at least one bending member that is movable to a plurality of circumferential locations around said cable's end, and further being reciprocally movable back and forth at each one of said locations, to push transversely against said slug portion, for bending said cable's end back and forth to break away said slug portion at the place where it was scored by said blades; and
   a slug puller for removing said slug portion from said cable's end after said slug portion has been broken away by said at least one bending member, said slug puller being reciprocally movable between at least one extended position that is adjacent said broken-away slug portion, and a retracted position that is axially spaced from said cable's end, said slug puller having opposing gripping surfaces operable to cooperatively grip the outer surface of said broken-away slug portion when said slug puller is in said at least one extended position, and operable to pull said brokenaway slug portion off said cable's end as said slug puller moves to said retracted position.

2. The cable stripper of claim 1, wherein said cutting and bending assembly further includes a hollow barrel portion positioned adjacent said clamping assembly, and having an end opening that faces said clamping assembly, said barrel portion being rotatably mounted to a base, said cable's end extending through said end opening and at least partially inside said barrel portion during a cable stripping operation, and wherein said plurality of cutting blades are mounted to said barrel portion in a manner so that they circle around said cable's end correspondingly with rotation of said barrel portion, and further, said bending member is mounted to said barrel portion in a manner so that it circles said cable's end as said barrel portion rotates, said bending member being positioned axially outwardly of said blades relative to said cable's end.

3. The cable stripper of claim 2, wherein said slug puller is reciprocally movable through said hollow barrel portion of said cutting and bending assembly.

4. The cable stripper of claim 3, including a pair of bending members mounted to said barrel portion, each bending member having a jacket-pushing surface that faces the jacket-pushing surface of the other.

5. The cable stripper of claim 4, including first air cylinder drive means, mounted to said barrel portion, for moving said plurality of blades radially inwardly and outwardly to respectively contact and retract from said cable's jacket.

6. The cable stripper of claim 5, including second air cylinder drive means, mounted to said barrel portion, for reciprocally moving each bending member back and forth into and away from jacket-pushing contact.

7. The cable stripper of claim 3, including an electric drive motor operably connected to said barrel portion by a drive belt, for rotating said barrel portion.

8. The cable stripper of claim 1, wherein said multi-conductor cable further includes a braided shield surrounding said cable's conductors, said shield underlying said jacket and being exposed upon pulling said slug portion off said cable's end, and wherein said cable guide member of said clamp assembly includes a hollow, cylindrically-shaped tubular portion through which said cable extends during a stripping operation, said tubular portion having an outer end that defines a circular die surrounding said cable, said circular die being positionable adjacent the position on said cable where said jacket is scored by said blades, and after said slug portion is removed from said cable's end, said gripping surfaces of said slug puller being further operable to grip said shield at a position that is axially outwardly of said die, and while gripping said shield, said slug puller being further operable to extend axially toward said die, to cause said gripping surfaces to bunch up a portion of said shield adjacent said die, and still further including, a tubular shear reciprocally movable toward and away from said die along an axis that is generally coincident with the center point of said die, said tubular shear having an end portion with an inner surface that is shaped to mate with said die, to shear off said bunched-up portion of said shield therebetween, thereby removing said bunched-up portion from the remainder of said shield to expose the ends of said cable's conductors.

9. The cable stripper of claim 8, wherein said slug puller further includes a hollow, cylindrical puller tube, and a pair of elongated lever arms, each lever arm having opposite outer ends, and each arm being pivotably mounted to said puller tube at a point that is intermediate of said opposite outer ends, wherein one of said gripping surfaces is pivotably mounted to one outer end of each arm, and wherein the other outer end of each arm has a cam follower surface, and a cam member surrounding said puller tube, said cam member having a sloped camming surface adapted to thrust against said cam follower surfaces of said lever arms, for pivoting said lever arms to adjust the distance between said gripping surfaces.

10. The cable stripper of claim 9, wherein said tubular shear is received within and axially reciprocates through said cylindrical puller tube.

11. The cable stripper of claim 10, wherein said cutting and bending assembly further includes a pair of bending members positioned transversely relative to said cable's end, each bending member having a jacket-pushing surface that faces the jacket-pushing surface of the other, and wherein said bending members are movable to a plurality of circumferential locations around said cable's end, and each bending member is further reciprocally movable back and forth at each one of said locations, between a position that pushes against said slug portion of said jacket and another position spaced apart from said slug portion for bending said cable's end back and forth to break away said slug portion from said cable's end, and further, said jacket-pushing surfaces of said bending members being electrically conductive.

12. The cable stripper of claim 2, wherein said multi-conductor cable further includes a braided shield surrounding said cable's conductors, said shield underlying said jacket and being exposed upon pulling said slug portion off said cable's end, and wherein said clamp assembly further includes a vertically upstanding mounting plate, and a plurality of guide rods projecting forwardly of said mounting plate, and said cable guide member further includes:

a cam plate that is substantially parallel to said mounting plate, said cam plate being slidably mounted on said guide rods for movement toward and away from said mounting plate, and a guide tube connected to said cam plate, wherein a cylindrical guideway extends through said cam plate and said guide tube, and further, said mounting plate has an opening in axial alignment with said cylindrical guideway, and during a stripping operation, said cable extends through both said mounting plate opening and said cylindrical guideway, and projects forwardly of said guide tube and at least partially inside said barrel portion.

13. The cable stripper of claim 12, wherein said clamp assembly further includes a clamp device positioned between said mounting plate and said cam plate, said clamp device having opposing clamping members that engage said cable from opposite sides and grip said cable therebetween.

14. The cable stripper of claim 13, wherein said guide tube of said cable guide member has an outer axial end that defines a circular die surrounding said cable, 2said circular die being positionable adjacent the place on said cable where said cutting blades score said cable's jacket, and wherein after said slug is removed from said cable's end to expose said braided shield, said gripping surfaces of said slug puller being operable to grip said shield at a position that is axially outwardly of said die, and while gripping said shield, said slug puller being further operable to extend axially toward said die, to bunch up a portion of said shield adjacent said die, and still further including, a tubular shear reciprocally movable toward and away from said die along an axis that is generally coincident with the center point of said die, said tubular shear having an end portion with an inner surface that is shaped to mate with said die, to shear off said bunched-up portion of said shield therebetween, thereby severing said bunched-up portion from the remainder of said shield.

15. The cable stripper of claim 14, wherein said clamp assembly further includes a pair of step-cam members that are reciprocable toward and away from each other at least part way in between said cam plate and said mounting plate, each step-cam member having a ramped surface for contacting an outer edge portion of said cam plate, said ramped surface having a plurality of separately sloped surfaces, and wherein said outer edge portion of said cam plate includes a roller for rolling along said ramped surface as said step-cam members reciprocate, to adjust the distance between said cam plate and said mounting plate, and spring means, interconnecting said cam plate and said mounting plate, and biased to normally pull said cam plate along said guide rods toward said mounting plate, wherein said ramped surfaces of said step-cam members oppose the bias of said spring means.

* * * * *

UNITED STATES PATENT AND TRADEMARK OFFICE
CERTIFICATE OF CORRECTION

PATENT NO. : 5,072,632

DATED : December 17, 1991

INVENTOR(S) : Babak Sayyadi

It is certified that error appears in the above-identified patent and that said Letters Patent is hereby corrected as shown below:

In the Abstract, 7th line from the bottom, "cable'3 s" should be
    -- cable's --.
Column 1, line 55, delete "15".
Column 2, line 27, "barrel'cylindrical" should be -- barrel's
    cylindrical --.
Column 4, line 40, "Fig. 5;" should be -- Fig. 6; --.
Column 5, line 51, after "edge portions", insert:
    -- 26a, 26b, which respectively carry rollers 28, 30.
    These --.
Column 7, line 18, "cut" 15 bent" should be -- cut or bent --.
Column 7, line 50, "air cylinders 108, 109" should be
    -- air cylinders 107, 109 --.
Column 8, line 10, there is a period after "it".
Column 8, line 37, "arms'inner" should be -- arms' inner --.
Column 9, line 12, "cam plates 36, 26" should be -- cam
    plates 136, 26 --.
Claim 1, column 10, line 41, "brokenaway" should be
    -- broken-away --.
Claim 14, column 12, line 32, "2said" should be -- said --.

Signed and Sealed this

Twenty-seventh Day of April, 1993

*Attest:*

MICHAEL K. KIRK

*Attesting Officer*   Acting Commissioner of Patents and Trademarks